J. Lintner,

Gate Latch.

No. 103,629.　　　Patented May 31, 1870.

Witnesses.
G. A. Skinner
O. F. Mayhew

John Lintner Inventor.

United States Patent Office.

JOHN LINTNER, OF INDIANAPOLIS, INDIANA.

Letters Patent No. 103,629, dated May 31, 1870.

IMPROVEMENT IN FASTENINGS FOR GATES.

The Schedule referred to in these Letters Patent and making part of the same.

I, JOHN LINTNER, of Indianapolis, in the county of Marion and State of Indiana, have invented certain Improvements in Gate-Fastenings, of which the following is a specification.

Nature and Objects of the Invention.

My invention consists in a suitably-constructed metal hook, that is loosely pivoted to the post against which the gate shuts, in such a manner that the stile of the gate will, as it is suddenly closed by hand, or by any of the devices in common use for that purpose, strike the hook and instantly revolve it to engage with the stile, the object being to construct a fastening that is not liable to be unfastened by stock, and which will both secure the gate before it can rebound, and so that it will not be liable to rattle.

Description of the Accompanying Drawing.

General Description.

A is the gate-post, and
B, the stile of the gate.
C is the revolving hook that secures the gate when closed.

Figure 1:
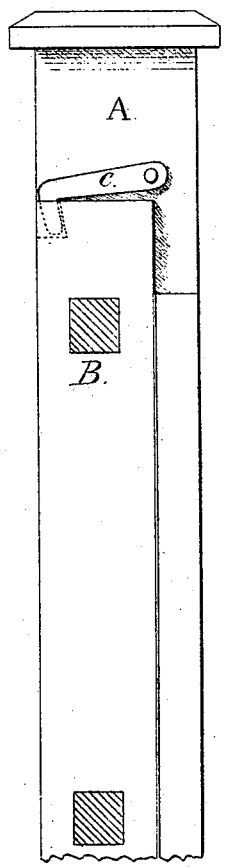
Figures 1 and 2 are vertical transverse sections through the gate, taken just inside the stile of the gate, fig. 1 showing the hook in position to hold the gate closed, and fig. 2 showing the hook in position to be revolved by the gate as it is closed.
Figure 2:
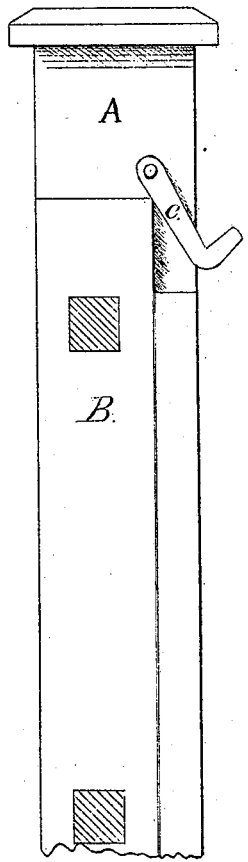
Figure 3:
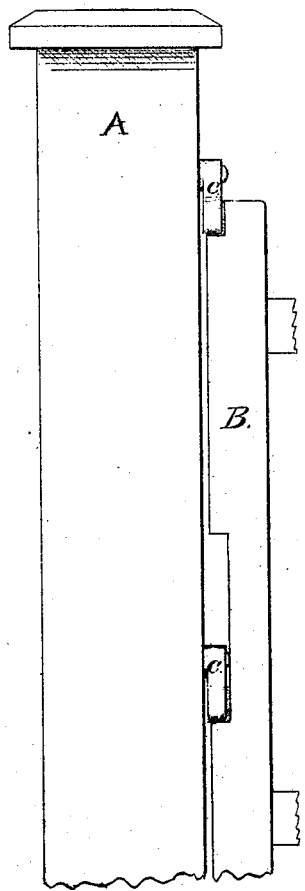
Figure 3 is a front elevation of the post and gate-stile.

This hook is pivoted to the post A in such a position that, when it is hanging down as shown in fig. 2, the stile of the gate, in falling shut, will strike it in such a manner and with such force as to revolve it.

The hook may be arranged at the top of the gate, as shown, or, when advisable to place it lower down, the stile may be notched sufficiently to allow the hook to revolve.

The hook may also be made shorter than here shown, and the stile notched to correspond, but it must be pivoted in the same position.

This hook may also be applied to the rear-end gates of express and delivery-wagons, and to other similar purposes, in the same manner, the particular point being to pivot the hook in such relation to the gate that it will be revolved by the gate as it is shut.

Claim.

I claim as my invention—

The arrangement of the hook C, pivoted to the post A, just above the top of the gate-stile, in such position that the latter will strike the hook below the pivoted point as the gate is closing, and throw it over into a notch in the front edge of the stile, substantially as set forth.

JOHN LINTNER.

Witnesses:
G. A. SKINNER,
O. F. MAYHEW.